United States Patent [19]

Beckord et al.

[11] 4,268,768
[45] May 19, 1981

[54] OFFICE MACHINE WITH AN ELECTRIC DRIVE MOTOR

[75] Inventors: Ulrich Beckord; Helmut Eder, both of Lengfeld, Fed. Rep. of Germany

[73] Assignee: Siemens Aktiengesellschaft, Berlin & Munich, Fed. Rep. of Germany

[21] Appl. No.: 22,851

[22] Filed: Mar. 22, 1979

Related U.S. Application Data

[63] Continuation of Ser. No. 832,823, Sep. 13, 1977, abandoned.

[30] Foreign Application Priority Data

Sep. 30, 1976 [DE] Fed. Rep. of Germany ... 7630630[U]

[51] Int. Cl.³ .............................................. H02K 9/06
[52] U.S. Cl. ........................................ 310/62; 310/89; 310/91; 98/43 R; 312/236
[58] Field of Search ...................... 98/43 R; 361/384; 310/60, 62, 63, 58, 59, 52, 65, 53, 51, 89, 91; 312/208, 236; 248/674

[56] References Cited

U.S. PATENT DOCUMENTS

| 2,922,570 | 1/1960 | Allen | 310/58 |
| 2,936,774 | 5/1960 | Holley | 310/62 |
| 2,957,665 | 10/1960 | Feiertag | 310/51 UX |
| 3,127,092 | 3/1964 | Shenberger | 310/91 |
| 3,206,148 | 9/1965 | Longworth | 310/91 |
| 3,739,207 | 6/1973 | Keilmann | 310/59 |
| 3,983,429 | 9/1976 | Allardice | 310/91 |

Primary Examiner—R. Skudy
Attorney, Agent, or Firm—Kenyon & Kenyon

[57] ABSTRACT

In an office machine with an electric drive motor which is arranged in a machine well and on the one shaft end of which an axial blower wheel is fastened to blow a stream of cooling air from an opening in the well in the vicinity of the one end of the motor, an external blower wheel is provided at the motor end facing away from the machine well opening outside the end bell of the motor and the axial blower wheel and the motor are surrounded by an air duct housing partly defined by the machine well and partly by a separate air baffle, in such a way that the air stream is conducted over the motor to the machine well opening to obtain forced surface ventilation.

3 Claims, 3 Drawing Figures

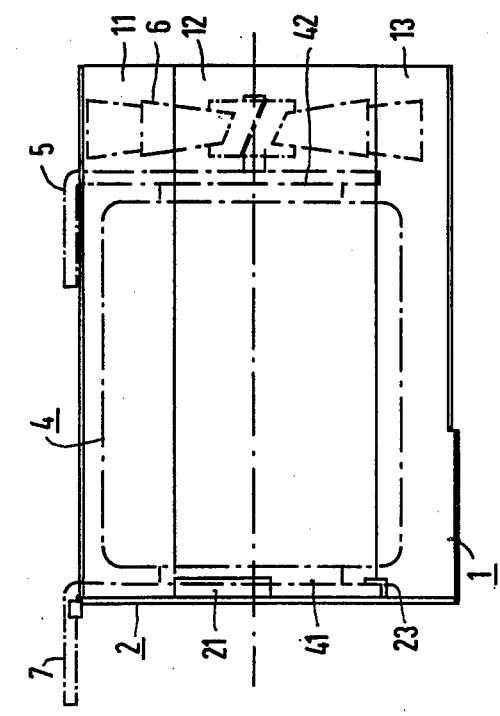
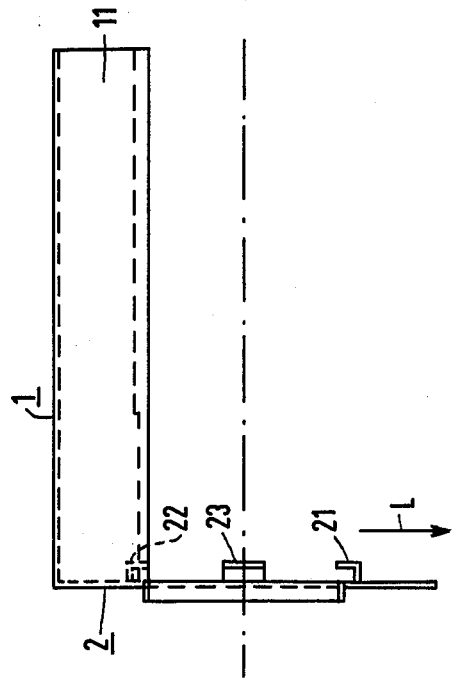
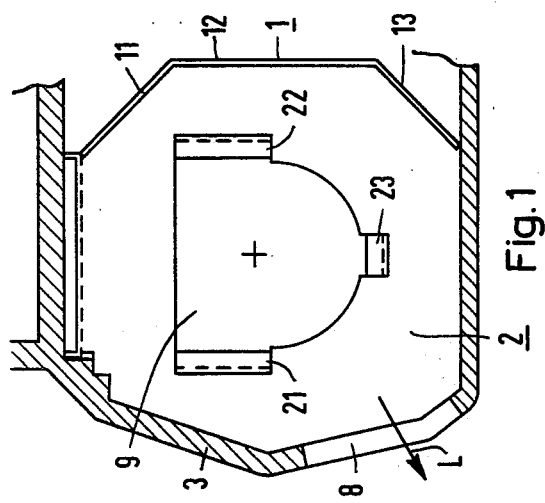

OFFICE MACHINE WITH AN ELECTRIC DRIVE MOTOR

This is a continuation, of application Ser. No. 832,823 filed Sept. 13, 1977 now abandoned.

BACKGROUND OF THE INVENTION

This invention relates to office machines with electric drive motors in general and more particularly to an improved cooling blower for such machines.

Office machines are known in which an electric motor is arranged in a machine well and has on one shaft end an axial blower wheel fastened which blows out a stream of cooling air from a machine well opening provided in the vicinity of the one motor end. In these prior art office machines, a capcitor motor with an additional internal blower is used. The additional internal blower is fastened at the motor end facing the machine well opening between the end bell and the winding head of the motor on the rotor shaft of the latter. A so-called axial-radial blower wheel which deflects the air, which flows in mainly axially, toward the machine well opening is used as the blower wheel.

SUMMARY OF THE INVENTION

It is an object of the present invention to ensure, with a simple design of the motor and the blower, a more effective heat removal of the temperature increase resulting from the dissipation loss of the motor. According to the present invention, the solution of this problem resides in providing an external blower wheel at the motor end facing away from the machine well opening outside the end bell of the motor and by surrounding the axial blower wheel and the motor with an air duct housing in such a manner that the air stream is conducted over the motor to the machine well opening to obtain forced surface ventilation.

According to a particular embodiment of the present invention, the air duct housing consists of a tube pushed over the axial blower wheel and the motor, and of an axial air baffle at the end face which is fastened and, in particular, snapped in thereto at the motor end opposite the axial blower wheel. The fabrication and material costs can be reduced further if the tubular part of the air duct housing is formed by the machine well and an axial air baffle which supplements the housing part formed by the machine well to form a peripherally closed tubular housing, and if an end baffle is formed onto the axial air baffle outside the end bell of the motor end facing away from the axial blower. A particularly simple mounting of the entire air duct housing formed by the axial and the end baffle is possible if the former is engaged with and/or pushed onto the motor mounting at the motor end facing away from the axial blower wheel via the end baffle; to particular advantage, angle brackets are bent out of the end baffle or are fastened to the latter for mounting purposes.

BRIEF DESCRIPTION OF THE DRAWINGS

FIG. 1 is a cross sectional view of an air duct housing composed of the machine well and an air baffle.

FIG. 2 is a side view of the air duct housing with the electric motor and axial blower wheel assembled.

FIG 3 is a top view onto the entire air baffle formed by the axial and end air baffle portions.

DETAILED DESCRIPTION OF THE INVENTION

Shown in FIG. 1 is a tubular air duct housing which is formed on its left side by an already available machine (well) 3 and on its right side by an axial air baffle 1. The drive motor 4 for the office machine, is mounted on motor mounting angle brackets 5 and 7 within the duct as shown by FIG. 2. At the end 42 of the motor 4 an axial blower wheel 6 is fastened on the rotor shaft outside its end bell and the mounting bracket 5. As can further be seen from the cross-sectional view of FIG. 1, an opening 8 is made on the lower side of the machine well 3. Opening 8, as it did in the prior art, serves as an air exit opening in the vicinity of the left hand end 41 of the motor, as seen in the axial direction of the motor 4.

An end air baffle portion 2, which contains a cutout 9 from which angles 21, 22 and 23 are bent out, is formed onto the axial air baffle 1. These angles 21, 22, and 23 allow a particularly simple mounting of the entire air baffle 1 in that the end air baffle portion 2 can be placed over the motor mounting at the angle 7 and can be detented there if desired. For specific design reasons, the axial air baffle 1 is angled in arc-fashion (angle section 11, 12, 13) in the present embodiment.

In the office machine ventilated in accordance with the present invention, two identical end bells can advantageously be used instead of two different ones. The simply designed external axial blower arranged on the motor side 42 facing away from the exhaust opening 8 provides for forced air circulation which ventilates and cools not only the coil heads of the motor end 41 but the entire motor. The tubular housing formed by the motor well 3 and the axial air baffle 1 is closed off at the motor end 41 by the end air baffle portion 2 which serves at the same time for mounting the entire air baffle, in such a manner that the axially inflowing air stream is deflected toward the ventilation opening 8 in direction L (FIG. 1). Thereby an effective forced ventilation of the office machine is achieved and the use of motors with considerably more heat dissipation that with the prior art solution is made possible. The entire air baffle can be snapped into place on the existing motor mounting without special tools.

What is claimed is:

1. In an office machine with an electric drive motor for driving the office machine which is arranged in a machine well and on the one shaft end of which an axial blower wheel is fastened which blows out a stream of cooling air from a machine well opening provided in the vicinity of the one motor end, the improvement comprising the blower being in the form of an external blower wheel disposed at the other end of the motor, outside the end of the motor, and an air duct housing surrounding the axial blower wheel and the motor in such a manner that the air stream is conducted over the motor toward the machine well opening to obtain forced surface ventilation, said air duct housing being formed in part by a portion of the machine well which partially encloses said electric drive motor.

2. The improvement according to claim 1 wherein said air duct housing further comprises an axial air baffle portion which cooperates with the portion formed by the machine well so as to form a peripherally closed tubular housing, and an end baffle portion formed onto said axial air baffle air portion outside the end of the motor facing away from the axial blower.

3. The improvement according to claim 2 and further including first and second brackets including outwardly extending portions supporting the one and other ends of said motor and wherein said end baffle portion contains bent-out angles, said end baffle portion being mounted onto one of said brackets at the motor end facing away from said axial blower wheel by means of said bent-out angles.

* * * * *